Aug. 2, 1932.  F. H. ROSENCRANTS  1,870,026
PULVERIZED FUEL BURNER
Filed Aug. 31, 1928
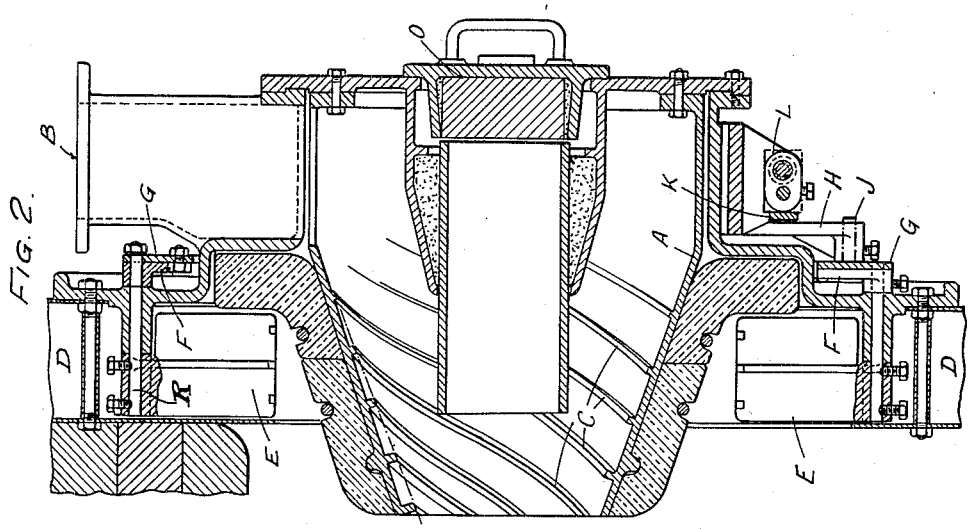
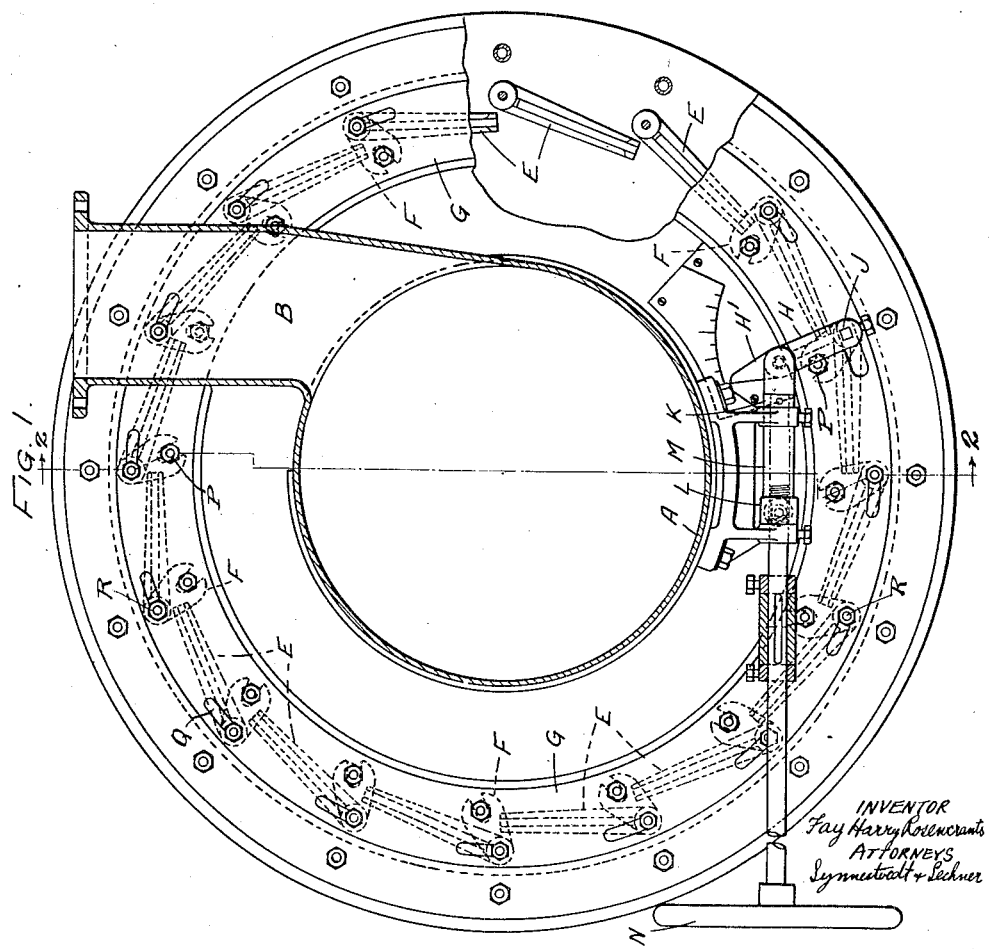
INVENTOR
Fay Harry Rosencrants
ATTORNEYS
Synnestvedt + Lechner

UNITED STATES PATENT OFFICE

FAY HARRY ROSENCRANTS, OF LONDON, ENGLAND, ASSIGNOR TO INTERNATIONAL COMBUSTION ENGINEERING CORPORATION, OF NEW YORK, N. Y., A CORPORATION OF DELAWARE

PULVERIZED FUEL BURNER

Application filed August 31, 1928, Serial No. 303,169, and in Great Britain September 6, 1927.

The invention relates to fuel burners of the kind in which the fuel, particularly pulverized fuel, and air are given a gyratory movement in the burner which continues more or less in the flame formed as the mixture passes into the combustion chamber. The fuel, and a portion of the combustion air known as primary air, are injected tangentially into a chamber from which, according to the present invention, it is discharged through a converging frustum of a cone into the furnace, the centrifugal action imparted to the mixture in the conical chamber causing it to be discharged from the latter as a diverging frustum of a cone. The secondary air, or that additional amount of air which must be added to secure complete combustion, enters through an annular chamber surrounding the cone preferably concentrically. This air meets the diverging cone of primary air and fuel at an angle and through impact with it secures an intimate mixture.

To secure the delivery of a uniform mixture of primary air and fuel from the outlet of the frustum of the cone, a multiplicity of spiral vanes are provided inside the cone frustum. The height of these vanes increases from a minimum which may be zero, at the base of the cone, to a maximum, e. g. one inch or more, at the outlet of the cone frustum.

Through the action of centrifugal force a large portion of the solid particles of fuel entering with the primary air rapidly separate from the main body of the air and circulate in close contact with the interior surface of the cone. As they are crowded towards the outlet, however, by the continuous admission of additional primary air and fuel, the particles distribute themselves in the channels between the spiral vanes. At first, where the vanes are low, the fuel particles flow over the edges of the vanes, but as the particles are crowded further towards the outlet, the increasing height of the vanes results in a majority of the particles finally being retained by the spirals and uniformly distributed between them.

The annular chamber through which the secondary air is supplied may be fitted with adjustable vanes, which may be used for controlling the direction in which the secondary air meets the gyratory column of air and fuel issuing from the cone, and the exterior of the cone may also be fitted with vanes which may either be straight fore and aft vanes or may be obliquely arranged to give the secondary air oblique direction.

In order that the invention may be understood, I will now proceed to describe one arrangement of same with the aid of the accompanying drawing, wherein Fig. 1 is a rear view of the apparatus with certain parts broken away and shown in section for the sake of clarity, and Fig. 2 is a sectional view taken substantially as indicated by the line 2—2 of Fig. 1.

The apparatus mainly consists of a fuel and primary air chamber A which at its discharge end is shaped as a converging frustum of a cone and into which fuel and air are injected tangentially through the opening B. The coned end of this chamber is arranged with a multiplicity of spiral vanes C which increase in height from the base of the cone to the discharge end.

An annular chamber D which surrounds the cone and through which secondary air is admitted is fitted with adjustable vanes or louvres E the inclination of which can be varied by means of levers F which are suitably coupled so as to be simultaneously actuated, for example by the rotation of a ring G coupled with the levers F by pin and slot connections P. This ring, as shown, is operated from lever H, which is rigidly attached to the squared spindle J carrying one of the levers F, and is connected by means of pivoted link K with a threaded nut L, which is actuated by the screw M on rotation thereof, the said rotation being effected by a suitable hand or chain wheel N. The lever H may have a pointer extension H' traversing a scale. Arcuate slot-like apertures Q are provided in the ring G for receiving the pivot shaft or spindle J as well as the pivot shafts R of the remaining vanes E in order to permit rotation of the ring with respect to the pivot shafts.

When it is desired to adjust the openings between the valves E the procedure is as follows:

Assuming that the vanes are in closed position as indicated in Fig. 1, the wheel N is rotated in a direction to cause the nut L and the link K to move to the right. This effects a movement of the lever H from the shaft J as a pivot point and causes the said shaft to rotate, with the result that the vane E and the lever F associated therewith are caused to rotate correspondingly. The connection of this particular lever F with the ring G (by means of the pin and slot connection P) causes a rotation of the ring and a corresponding movement of all the other levers F and vanes E.

A door O is provided in the back of the fuel and air chamber A to close any aperture which may be used for lighting up, or for the purpose of receiving an oil burner so that the apparatus may be used for burning oil fuel with or without other fuel injected, as hereinbefore described, into the chamber A.

Having thus described the nature of the said invention and the best means I know of carrying the same into practical effect, I claim:—

1. In combination with a furnace, a pulverized fuel burner having a nozzle adapted to discharge into the furnace and means for admitting air into the furnace to mix with the fuel discharged, said means including an air chamber around the nozzle and a series of louvres for the passage of air from the chamber substantially radially inwardly toward the nozzle in the vicinity of its discharge end to mix with the fuel discharged, together with means for adjusting the opening through the louvres including a separate shaft for each louvre rigidly secured thereto and mounted for rotation in a fixed position, a separate arm moving with each shaft, a single actuating member operatively connected with each arm whereby the louvres are interconnected to move in unison and control means for said louvres operatively associated with the shaft of one of them.

2. A pulverized fuel burner including a nozzle member of circular cross-section having a tangential fuel inlet and a concentric fuel outlet and spirally arranged vanes on the inner surface of said member, said vanes being of greater height toward the outlet end of the nozzle member than at the inlet end thereof.

In testimony whereof I have signed my name to this specification.

FAY HARRY ROSENCRANTS.